(12) United States Patent
Aldalbahi et al.

(10) Patent No.: US 10,703,641 B1
(45) Date of Patent: Jul. 7, 2020

(54) **SYNTHESIS OF METAL OXIDE NANOPARTICLES USING *KALANCHOE BLOSSFELDIANA* EXTRACT**

(71) Applicant: KING SAUD UNIVERSITY, Riyadh (SA)

(72) Inventors: Ali Kanakhir Aldalbahi, Riyadh (SA); Seham Soliman Alterary, Riyadh (SA); Ruba Ali Abdullrahman Almoghim, Riyadh (SA); Manal Ahmed Gasmelseed Awad, Riyadh (SA); Noura Saleem Aldosari, Riyadh (SA); Shoog Fahad Abdullah Algannam, Riyadh (SA); Alhanouf Nasser Abdulaziz Alabdan, Riyadh (SA); Shaden Abdullah Alharbi, Riyadh (SA); Bedoor Ali Al-Ateeq, Riyadh (SA); Atheer Abdulrahman Al-Mohssen, Riyadh (SA); Munirah Abdulaziz Abdullah Alkathri, Riyadh (SA); Raghad Abdulrahman Alrashed, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/685,113

(22) Filed: Nov. 15, 2019

(51) Int. Cl.
*C01G 9/02* (2006.01)
*C01G 5/00* (2006.01)
(Continued)

(52) U.S. Cl.
CPC ............... *C01G 9/02* (2013.01); *C01G 5/00* (2013.01); *B82Y 30/00* (2013.01); *B82Y 40/00* (2013.01); *C01P 2004/64* (2013.01)

(58) Field of Classification Search
None
See application file for complete search history.

(56) References Cited

U.S. PATENT DOCUMENTS 9,889,170 B1 * 2/2018 Awad ............... A61K 36/185
10,358,356 B1 * 7/2019 Awad ............... B01J 23/06

FOREIGN PATENT DOCUMENTS

UA          81093 U          6/2013

OTHER PUBLICATIONS

Fakhari, S. et al., "Green synthesis of zinc oxide nanoparticles: a comparison", Green Chemistry Letters and Reviews, vol. 12, No. 1, pp. 19-24, DOI:10.1080/17518253.2018.1547925, Published online Jan. 11, 2019.*

(Continued)

*Primary Examiner* — George Wyszomierski
(74) *Attorney, Agent, or Firm* — Richard C. Litman; Nath, Goldberg & Meyer (57) ABSTRACT

A method for synthesizing metal nanoparticles can include combining a metallic nitrate with an extract of *Kalanchoe blossfeldiana* to form the metal nanoparticles. The method can include adding an aqueous solution of silver nitrate ($AgNO_3$) to the extract of *Kalanchoe blossfeldiana* to form silver nanoparticles. The method can include dissolving zinc nitrate hexahydrate ($Zn(NO_3)_2 \cdot 6H_2O$) in an extract of *Kalanchoe blossfeldiana* to provide a zinc nitrate extract solution, stirring the zinc nitrate extract solution, and adding an aqueous solution of sodium hydroxide (NaOH) to the zinc nitrate extract solution to form zinc oxide nanoparticles.

3 Claims, 8 Drawing Sheets

(51) Int. Cl.
  *B82Y 30/00* (2011.01)
  *B82Y 40/00* (2011.01)

(56) References Cited

OTHER PUBLICATIONS

Agarwal, H. et al., "Synthesis and optimization of zinc oxide nanoparticles using Kalanchoe pinnata towards the evaluation of its anti-inflammatory activity", Journal of Drug Delivery Science and Technology, vol. 54 (2019) 101291, Available online Sep. 17, 2019.*

Phatak et al., "Sunlight induced green synthesis of silver nanoparticles using sundried leaves extract of Kalanchoe pinnata and evaluation of its photocatalytic potential," Der Pharmacia Lettre, 7(5):313-324, Jan. 2015.

Agarwal et al., "Green Synthesis of Silver Nanoparticle using Kalanchoe pinnata leaf extract and its Antibacterial Effect against Gram-Positive and Gram-Negative Species," Research Journal of Pharmacy and Technology, 11(9):3964, Jan. 2018 (Abstract).

Molina et al., "Green synthesis of Ag nanoflowers using Kalanchoe Daigremontiana extract for enhanced photocatalytic and antibacterial activities," Colloids Surf B Biointerfaces, Aug. 1, 2019;180:141-149 (Abstract).

* cited by examiner

FIG. 14

SYNTHESIS OF METAL OXIDE NANOPARTICLES USING *KALANCHOE BLOSSFELDIANA* EXTRACT

BACKGROUND

1. Field

The disclosure of the present patent application relates to nanoparticle synthesis, and particularly, to a method of synthesizing metal oxide nanoparticles using *Kalanchoe blossfeldiana* extract.

2. Description of the Related Art

Nanotechnology is the science of the utilization and application of nanoscale structures. At this scale, atoms and molecules behave differently and provide a variety of unexpected and interesting new uses. Nanoparticles (NPs) have gained importance in technological developments due to their physicochemical characteristics, such as melting point, electrical and thermal conductivity, catalytic activity, antibacterial activities, and light absorption and scattering, resulting in enhanced performance compared with their bulk counterparts.

Nanoparticles and nanotechnology are useful in different fields such as nanomedicine (nano-drugs and medical devices), chemicals and cosmetics (paints and coating), environment and energy (water and air purification filters), and electronics (memory storage). Of the various metal oxide nanoparticles that exist, zinc oxide nanoparticles (ZnO NPs) have attracted the attention of many researchers, owing to their various applications in electronics, communications, sensor, catalysis, cosmetics, environmental protection, and biological and medicinal industries. Zinc oxide nanoparticles are particularly useful, not only because of their unique physical properties, but also because of their wide variety of morphologies, hexagonal phase, n-type semiconductor, and wurzite structure.

Silver nanoparticles (Ag NPs) also possess desirable properties, such as good chemical stability, catalytic properties, electrical conductivity, and antibacterial potential. Silver nanoparticles have a number of applications, especially as antimicrobial agents with potential for use in cosmetics, medicine, electronics, formulation of dental resin composites, and in the food industry as a component of food packaging materials, coatings for various surgical medical devices and textile industries.

Thus, a method of synthesizing metal nanoparticles solving the aforementioned problems is desired.

SUMMARY

A method for synthesizing metal nanoparticles can include adding a metallic nitrate to an extract of *Kalanchoe blossfeldiana* to form the metal nanoparticles. In an embodiment, the method can include adding an aqueous solution of silver nitrate ($AgNO_3$) to the extract of *Kalanchoe blossfeldiana* to form silver nanoparticles. In an embodiment, the method can include dissolving zinc nitrate hexahydrate ($Zn(NO_3)_2 \cdot 6H_2O$) in an extract of *Kalanchoe blossfeldiana* to provide a zinc nitrate extract solution, stirring the zinc nitrate extract solution, and adding an aqueous solution of sodium hydroxide (NaOH) to the zinc nitrate extract solution to form zinc oxide nanoparticles.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method for synthesizing metal nanoparticles can include combining a metallic nitrate with an extract of *Kalanchoe blossfeldiana* to form the metal nanoparticles. In an embodiment, the method can include adding an aqueous solution of silver nitrate ($AgNO_3$) to the extract of *Kalanchoe blossfeldiana* to form silver nanoparticles (herein, "Ag NPs"). In an embodiment, the method can include dissolving zinc nitrate hexahydrate ($Zn(NO_3)_2 \cdot 6H_2O$) in an extract of *Kalanchoe blossfeldiana* to provide a zinc nitrate extract solution, stirring the zinc nitrate extract solution, and adding an aqueous solution of sodium hydroxide (NaOH) to the zinc nitrate extract solution to form zinc oxide nanoparticles (herein, "ZnO NPs"). As used herein, the term "about," when used to modify a numerical value, means within ten percent of that numerical value.

*Kalanchoe blossfeldiana* is a house plant that blooms many smaller flowers within a flower head. *Kalanchoe blossfeldiana* requires warm temperatures and is native to Madagascar. In an embodiment, the extract is a water extract. The water extract of *Kalanchoe blossfeldiana* can be synthesized by cutting the *Kalanchoe blossfeldiana* plant into small pieces and adding boiling water to the pieces to form an extract.

In an embodiment, the method can include adding silver nitrate ($AgNO_3$) to water to form a silver nitrate solution, stirring the solution at room temperature, and adding an extract of *Kalanchoe blossfeldiana* to the solution to form a solution including silver nanoparticles, referred to herein as, "Ag nanoparticle solution." In an embodiment, a pH of the extract is adjusted to 7 prior to adding the silver nitrate solution. Formation of the Ag NPs during the reduction process is indicated by a change in the color of the reaction solution from colorless to dark brown. In an embodiment, the silver nanoparticles have an average particle size of about 139 nm.

In an embodiment, the method can include dissolving zinc nitrate hexahydrate ($Zn(NO_3)_2.6H_2O$) in an extract of *Kalanchoe blossfeldiana* to provide a zinc nitrate extract solution, stirring the solution, and adding an aqueous solution of sodium hydroxide (NaOH) to the solution to form a solution including zinc oxide nanoparticles, referred to herein as, "ZnO nanoparticle solution." In an embodiment, the aqueous solution of sodium hydroxide can be added dropwise to the zinc nitrate extract solution under magnetic stirring and then stirred for about 30 minutes to form the ZnO nanoparticle solution. In an embodiment, the precipitates in the ZnO nanoparticle solution can be dried to form a beige powder including ZnO nanoparticles. In an embodiment, the precipitates can be dried at about 200° C. for about 5 hours. In an embodiment, the ZnO nanoparticles have an average particle size of about 94 nm.

In an embodiment the metal nanoparticles can be used to inhibit microbial growth by contacting a microbe with the metal nanoparticles. In an embodiment, the metal nanoparticles include silver nanoparticles. In an embodiment, the metal nanoparticles include zinc nanoparticles. In an embodiment, the metal nanoparticles can be used to inhibit bacterial growth. In an embodiment, the metal nanoparticles can be used to inhibit fungal growth. In an embodiment, the Ag nanoparticle solution can be used to inhibit microbial growth. In an embodiment, the ZnO nanoparticle solution can be used to inhibit microbial growth.

The following examples illustrate the present teachings.

Example 1

Preparation of Extract

A wilting *Kalanchoe blossfeldiana* (house plant) was cut into small pieces and washed well. Then, 100 ml of boiled distilled water was added to 52 g of the *Kalanchoe blossfeldiana* pieces to form an extract. The extract was filtered through gauze and kept until needed.

Example 2

Preparation of Zinc Oxide Nanoparticles 0.5M zinc nitrate hexahydrate ($Zn(NO_3)_2.6H_2O$) were dissolved in 50 ml of *Kalanchoe blossfeldiana* extract to form a mixture. The mixture was stirred at 90° C., then an aqueous solution of 1 M of sodium hydroxide (NaOH) was added dropwise into the mixture under magnetic stirring. After addition of the NaOH, stirring was continued for 30 min. The resulting precipitates were dried at 200° C. for 5 hours, forming a beige powder containing ZnO nanoparticles.

Figure 1:
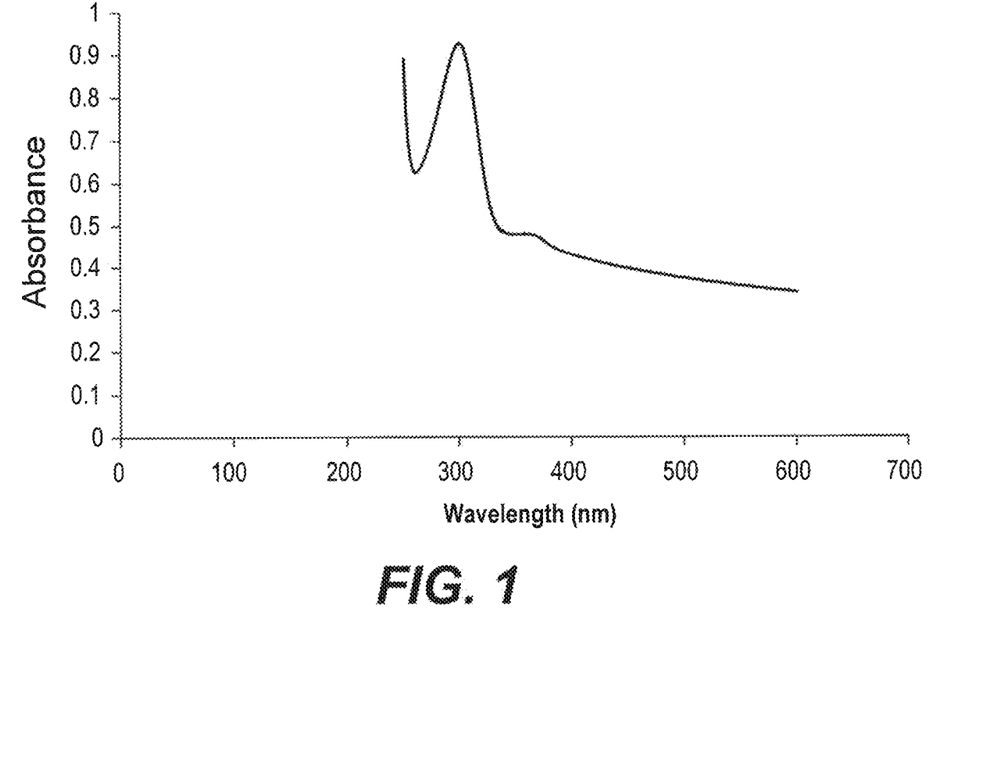
FIG. 1 depicts the absorption spectra of the ZnO NPs synthesized according to the present teachings.

The optical absorption spectra of the zinc oxide nanoparticles were recorded using UV/VIS spectrometer. As shown in FIG. 1, the absorption spectrum recorded for the sample was in the range of 200 nm-600 nm. The spectrum showed an absorbance peak at 306 nm, corresponding to the characteristic band of zinc oxide nanoparticles.

Figure 2:
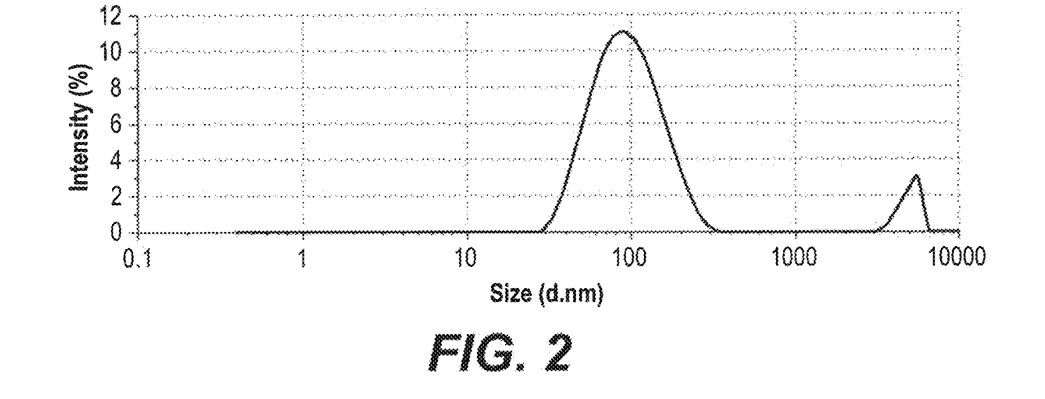
FIG. 2 depicts the size distribution of the ZnO NPs synthesized according to the present teachings.

Particle size was determined by dynamic light scattering technique. Dynamic light scattering is a widely used technique for the determination of particle size in colloidal solution. The average size of the particles, size distribution, and polydispersity index (PDI) of the synthesized zinc oxide nanoparticles were determined by this technique and the results are shown in FIG. 2. As shown in Table 1, the average particle size was 94.36 nm, the polydispersity index (PdI) was 0.367, which indicates that the synthesized particles were polydispersed.

TABLE 1

| Size Analysis for ZnO nanoparticles | | | |
|---|---|---|---|
| | SIze (d · nm) | % Intensity | St. Dev (d · nm) |
| Z-Average (d · nm.): 94.36 | Peak 1 | 101.4 | 93.3 | 47.20 |
| PdI: 0.367 | Peak 2 | 4969 | 6.7 | 626.1 |
| Intercept: 0.707 | Peak 3 | 0.000 | 0.0 | 0.00 |

Figure 3:
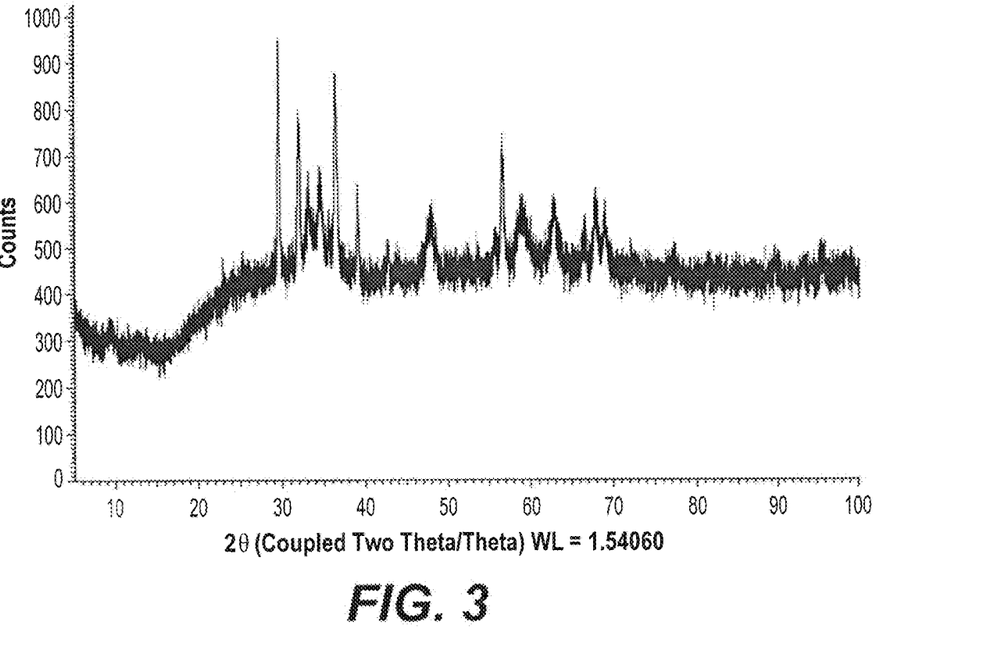
FIG. 3 depicts X-Ray diffraction (XRD) pattern for the ZnO NPs.
Figure 4A:
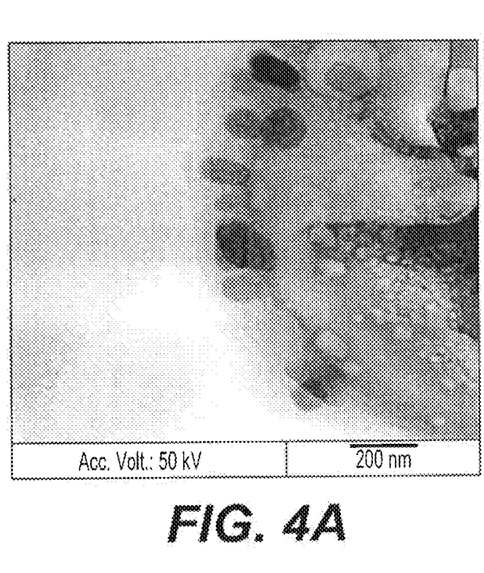
FIGS. 4A-4B depict transmission electron microscopy (TEM) images of the ZnO NPs.
Figure 4B:
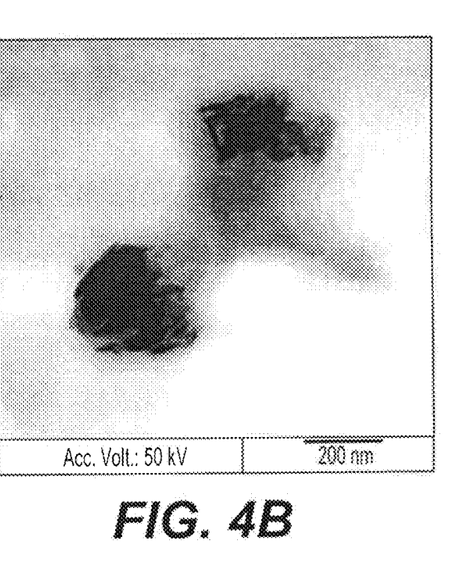

The X-Ray diffraction (XRD) pattern of the green synthesized zinc oxide nanoparticles is shown in FIG. 3. The X-Ray diffraction pattern shows 2θ values at about 31', 34°, 36', 47', 56', 63", 68" and 69". Zinc oxide crystallizes in two main forms, hexagonal wurtzite and cubic zincblende. The wurtzite structure is most stable at ambient conditions and thus, most common. It also confirms that the synthesized nanopowder was free of impurities as does not contain any characteristic XRD peaks other than zinc oxide peaks The morphology and particle size of the green synthesized ZnO NPs were examined using TEM, as shown in FIGS. 4A-4B. As can be seen, the particles display rod-like, hexagonal, and spherical shapes.

Figure 5A:
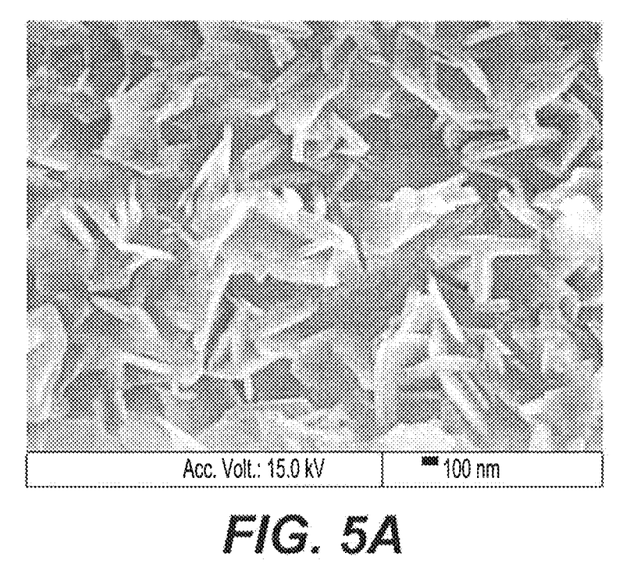
FIG. 5A depicts scanning electron microscopy (SEM) image of the ZnO NPs.
Figure 5B:
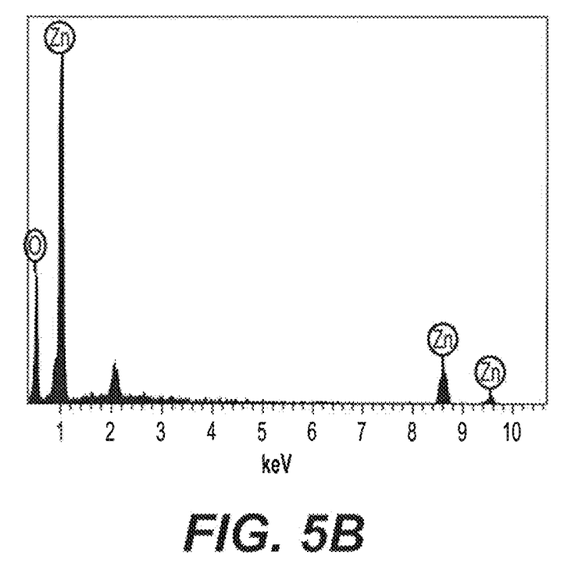
FIG. 5B depicts energy dispersive spectrometer (EDS) analysis of the ZnO NPs.

The morphology of green synthesized ZnO nanoparticles was studied using images obtained by scanning electron microscopy (SEM). FIG. 5A clearly shows that the zinc oxide nanoparticles have a different morphology, such as rod-like and spherical shapes. These results agree with the results obtained by TEM. Elemental analysis of the AgNPs was confirmed by energy dispersive spectrometer (FIG. 5B). A strong signal of the peak of Zn and O elements were observed. The absence of other elements confirms the purity of the prepared ZnO nanoparticles.

Figure 6:
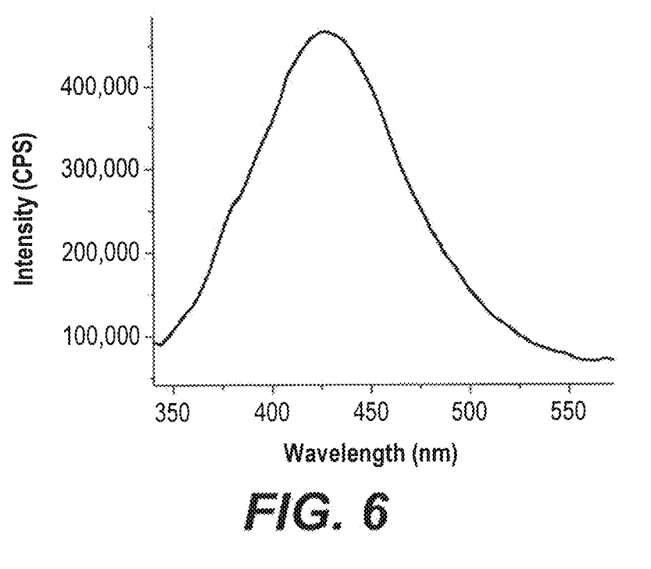
FIG. 6 depicts the photoluminescence spectrum of the ZnO NPs synthesized according to the present teachings.

Photoluminescence (PL) analyses were performed to emphasize the emission properties of green synthesized zinc oxide nanoparticles, as shown in FIG. 6. The luminescence spectrum of the ZnO NPs showed an emission peak at k, 440 nm upon photoexcitation at & 280-300 nm and the intensity increased sharply as shown in FIG. 6.

Example 2

Preparation of Silver Nanoparticles

Synthesis of silver nanoparticles included the addition of 1 mM of silver nitrate ($AgNO_3$) to 50 ml of distilled water to form a silver nitrate solution. The solution was stirred in the stirrer for 15 minutes at room temperature. Then, 5 ml of *Kalanchoe blossfeldiana* extract (with pH adjusted to 7)

were added to the solution. After 1 minute, the color changed to dark brown, indicating the formation of silver nanoparticles.

Figure 7:
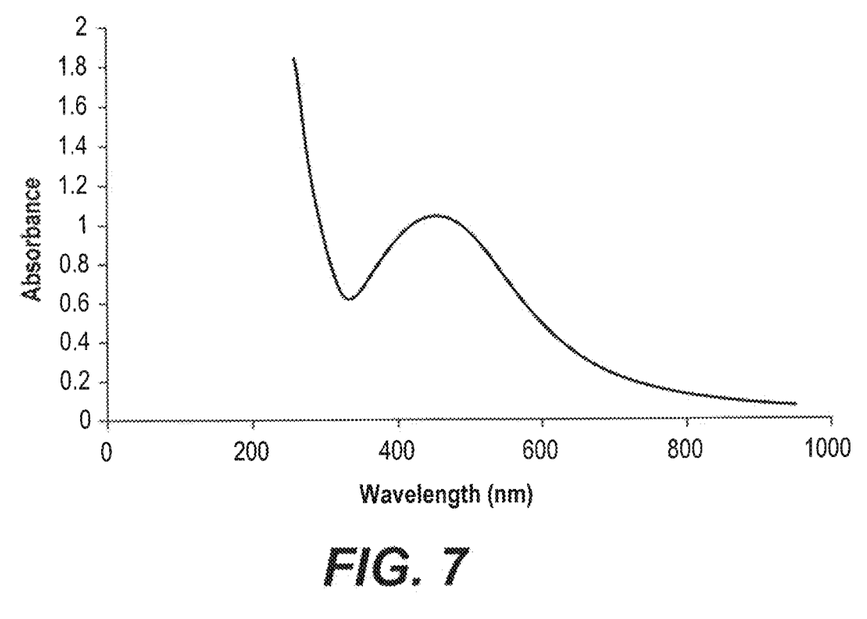
FIG. 7 depicts absorption spectra of the silver nanoparticles (AgNPs) synthesized according to the present teachings.

The formation of the AgNPs during the reduction process is indicated by a change in the color of the reaction solution from colorless to dark brown, which can be visually observed. The absorption spectrum shows peaks in the range of 390-480 nm as shown in FIG. 7.

Figure 8:
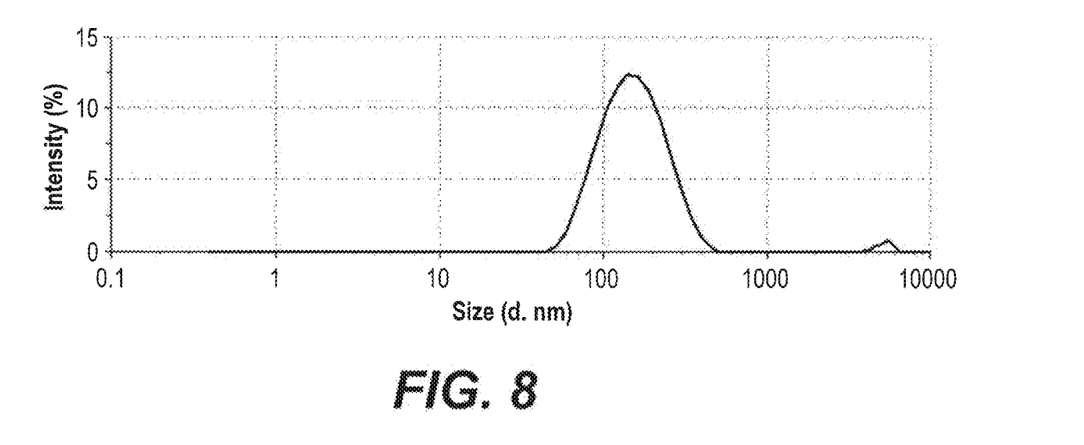
FIG. 8 depicts the size distribution analysis of the AgNPs synthesized according to the present teachings.

The DLS size distribution analysis results of the green synthesized silver nanoparticles is shown in FIG. 8. It was observed that the average particle size distribution of AgNPs was 138.9 nm. As shown in Table 2, the polydispersity index (PdI) found was 0.231 which indicates synthesized particles are monodispersed.

TABLE 2

Size Analysis for Ag NPS

| | | SIze (d · nm) | % Intensity | St. Dev (d · nm) |
|---|---|---|---|---|
| Z-Average (d · nm.): 138.9 | Peak 1 | 163.4 | 98.7 | 71.59 |
| PdI: 0.231 | Peak 2 | 5168 | 1.3 | 491.2 |
| Intercept: 0.942 | Peak 3 | 0.000 | 0.0 | 0.00 |

Figure 9A:
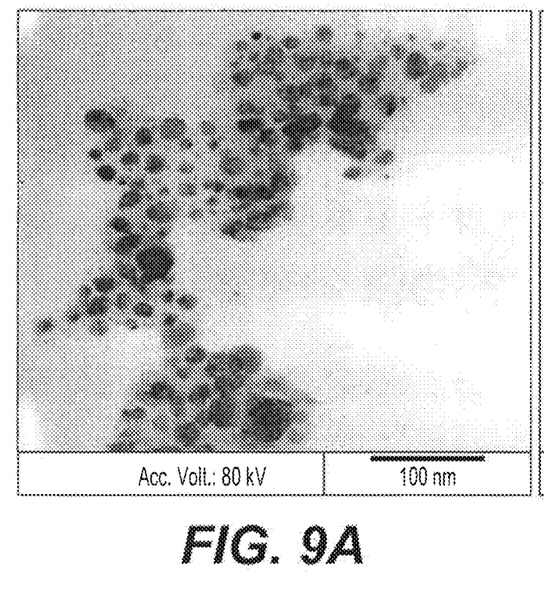
FIGS. 9A-9B depict transmission electron microscopy (TEM) images of the AgNPs synthesized according to the present teachings.
Figure 9B:
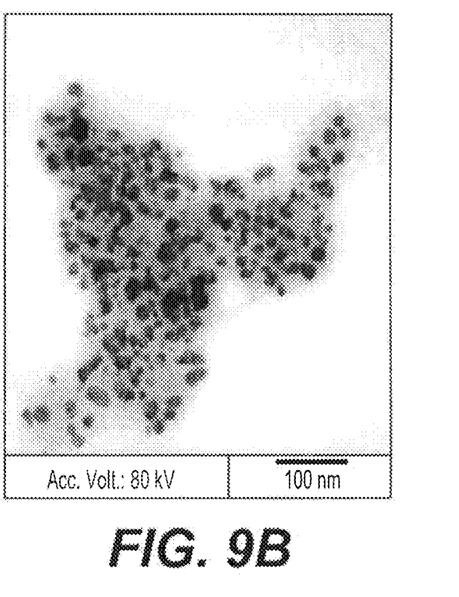

The shape and size of the resultant particles were investigated with the help of transmission electron microscopy (TEM). The TEM micrographs suggest that the sizes of the particles were around 50 nm. The particles were of spherical shape (FIGS. 9A-9B). The size measured by TEM analysis was lower than that measured by DLS analysis.

Figure 10A:
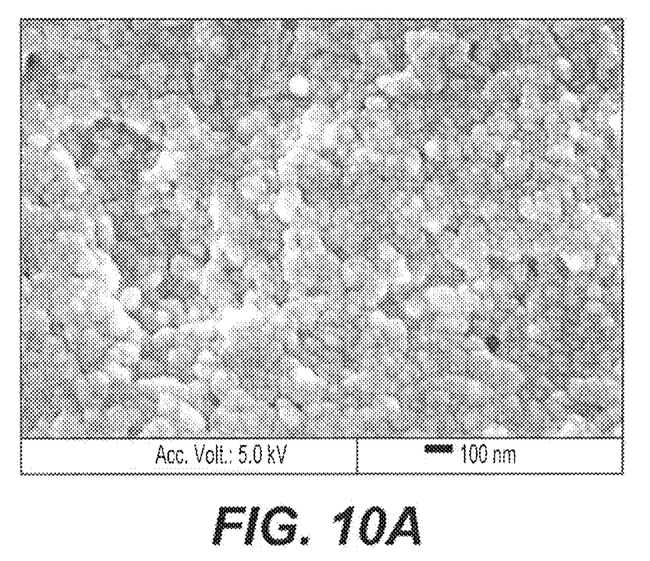
FIG. 10A depicts a scanning electron microscopy (SEM) image of the Ag NPs.
Figure 10B:
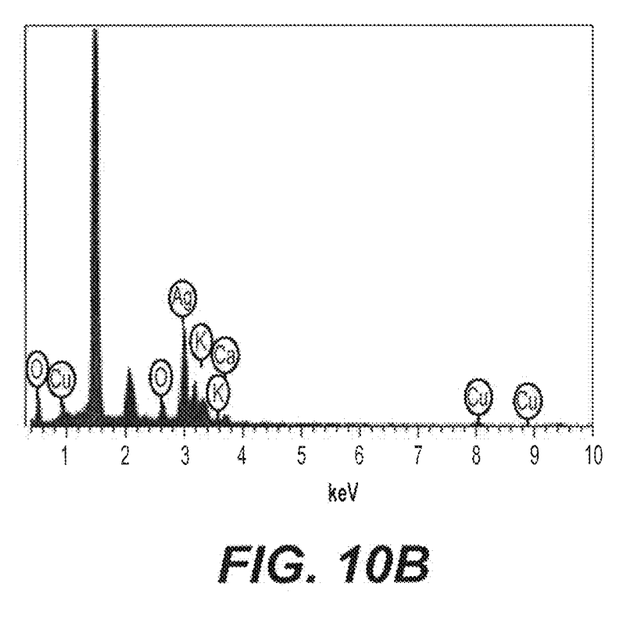
FIG. 10B depicts energy dispersive spectrometer (EDS) analysis of the Ag NPs.

Scanning electron microscopy (SEM) images of the green synthesized silver nanoparticles showed mostly spherical particles as shown in FIG. 10A. Elemental mapping of AgNPs by energy dispersive spectrometer (EDS) shows the presence of Ag and other elements from the extract as shown in FIG. 10B.

Figure 11:
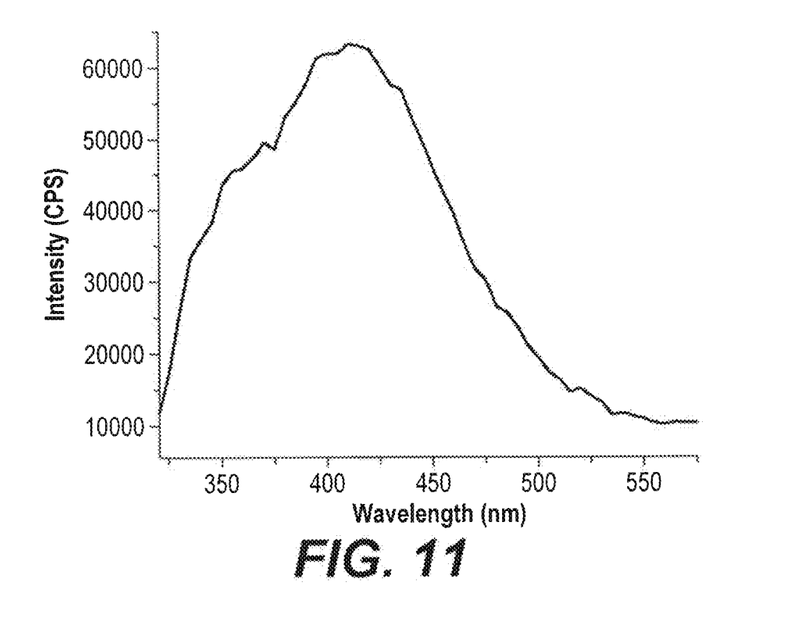
FIG. 11 depicts the photoluminescence spectrum of the Ag NPs synthesized according to the present teachings.

The luminescence spectrum of the green synthesized AgNPs showed an emission peak at $\lambda_{em}$ 425 nm and the intensity increased sharply, appearing as a broad peak, as shown in FIG. 11. This clearly revealed the reduction of silver using the extract greatly improved the photoluminescence property of AgNPs.

Example 3

Screening of Microbial Activity of Green Synthesized Silver Nanoparticles

The antimicrobial activities of the synthesized silver nanoparticles formed by *Kalanchoe blossfeldiana* extract were tested by agar well diffusion method (Perez et al., 1990). The human pathogenic microorganisms used in this study included the four bacterial strains—*Escherichia coli, Pseudomonas aeruginosa, Staphylococcus aureus*, and *Bacillus*—as well as the four fungal strains, namely, *Helmenthosporium fungi, Alternaria alternata fungi* and, and *Fusarium oxysporium fungi*. The bacterial cultures were grown on blood agar at 37° C. for 18 h and the colonies were suspended in saline (0.85% NaCl) whose turbidity was adjusted to 0.5 MacFarland standards (108 CFU/mL). The bacterial and fungal suspensions were swabbed on Muller Hinton agar (MHA) plates and potato dextrose Agar (PDA) medium, respectively. Wells were cut and 100 μL of the synthesized AgNPs were loaded in the wells. Then, the plates were incubated at 37° C. for 18-24 h (for bacteria) and 28° C. for 48-72 h (for fungi). After incubation, the plates exhibited the formation of a clear inhibition zone around the well, which indicated the presence of antimicrobial activity. The zone of inhibition was calculated by measuring the diameter of the inhibition zone around the well.

Figure 12:
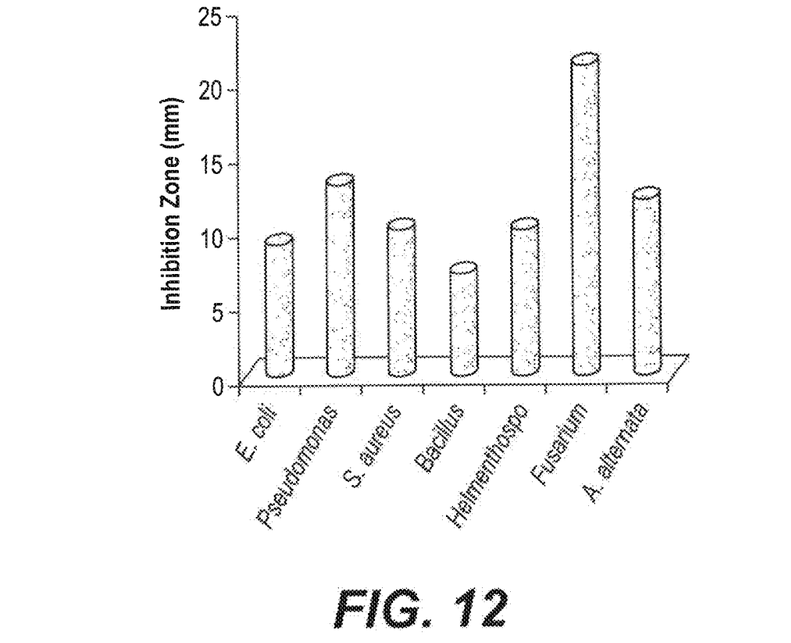
FIG. 12 is a graph depicting the antimicrobial activity of AgNPs synthesized from *Kalanchoe blossfeldiana* extract using agar well diffusion

As shown in FIG. 12, the AgNPs synthesized using *Kalanchoe blossfeldiana* possess excellent antimicrobial activity against bacteria and fungal.

Example 4

Photocatalytic Measurements

Photocatalytic activity of the green synthesized zinc oxide nanoparticles was evaluated under UV irradiation with methylene blue (MB) and Eusin dyes. A 30 ml dye solution was put in a laboratory-scale cuvette and the photocatalyst sample was dispersed inside the cuvette, facing UV light at a distance from lamp (lamp of UV light). Optical absorption spectra were determined upon different light exposure durations using a UV/Vis spectrophotometer in order to monitor the rate of degradation by recording the reduction in absorption intensity of dye at the maximum wavelength. The degradation efficiency (DE) was calculated according to the following equation:

$$DE\% = (A_0 - A)/A_0 \times 100$$

where $A_0$ is the initial absorption and A is the absorption intensity after photodegradation.

Figure 13:
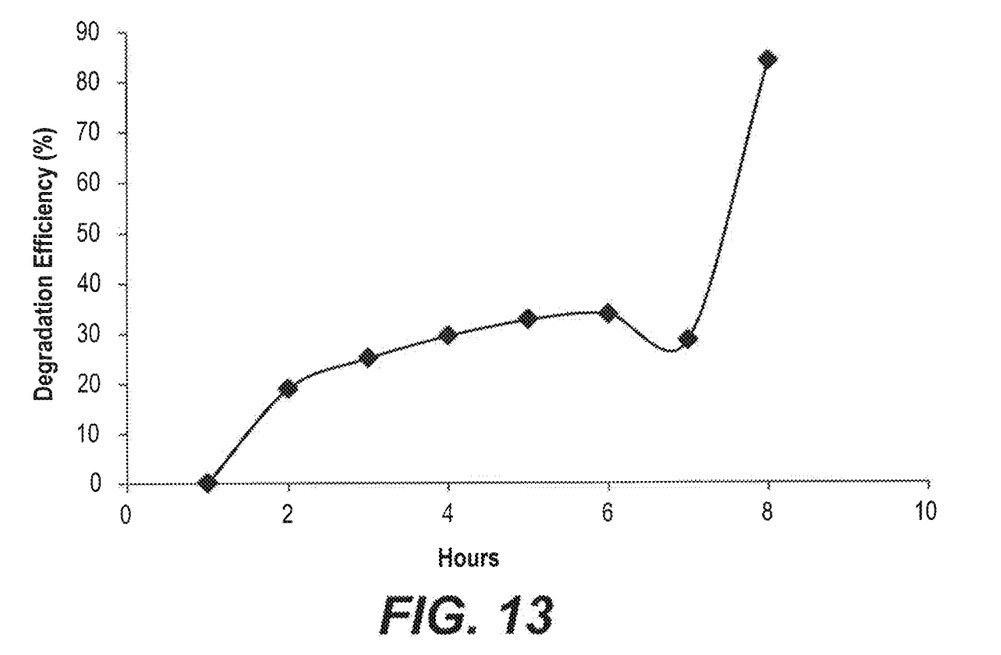
FIG. 13 is a graph depicting the MB dye degradation efficiency for the ZnO NPs.
Figure 14:
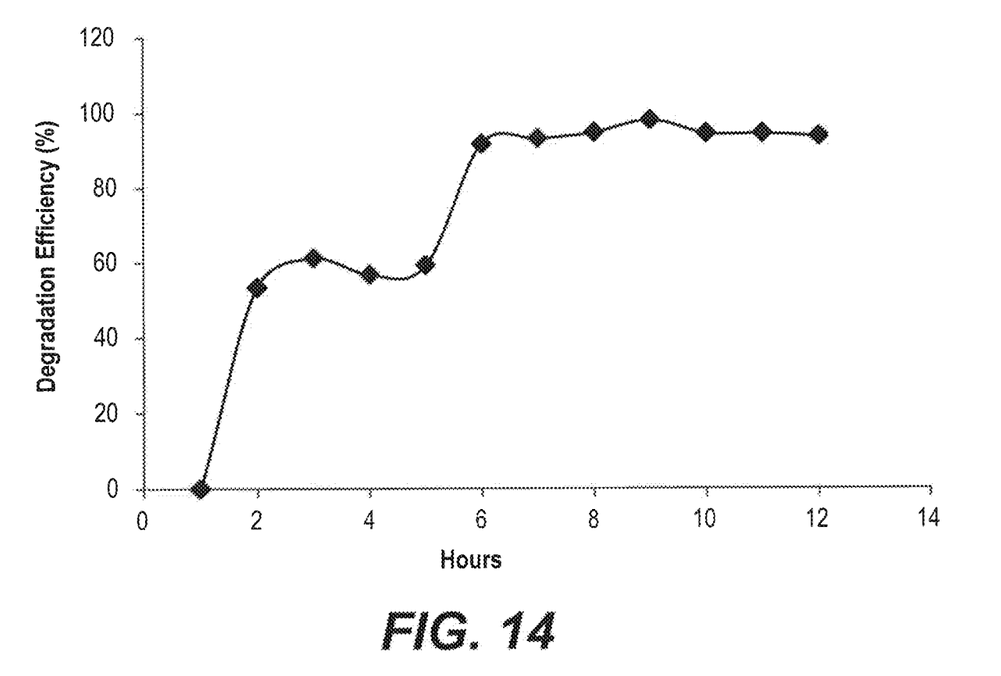
FIG. 14 is a graph depicting the Eusin dye degradation efficiency for the ZnO NPs.

The photocatalytic activity of green ZnO NPs was examined. As expected, the green ZnO NPs catalyst gave a good response under UV irradiation where the removal % was 84% after 33 h under UV irradiation for the MB dye (FIG. 13). While, the removal % was about 94% after 53 h under UV irradiation for the Eusin dye (FIG. 14). The excellent degradation efficiency for resulting greener synthesized ZnO NPs using *Kalanchoe blossfeldiana* extract which opens a wide range of photocatalysis applications of ZnO NPs such as in water treatment.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of synthesizing zinc oxide nanoparticles, comprising: adding zinc nitrate hexahydrate to an extract of *Kalanchoe blossfeldiana* to form a zinc nitrate extract solution, stirring the zinc nitrate extract solution, and adding an aqueous solution of sodium hydroxide to the zinc nitrate extract solution to form a solution including the zinc oxide nanoparticles, wherein the zinc oxide nanoparticles have an average particle size of about 94 nm.

2. The method of synthesizing zinc oxide nanoparticles of claim 1, wherein the aqueous solution of sodium hydroxide is added dropwise to the zinc nitrate extract solution under magnetic stirring.

3. The method of synthesizing zinc oxide nanoparticles of claim 1, wherein the solution including zinc oxide nanoparticles is dried to form a powder including the zinc oxide nanoparticles.

* * * * *